United States Patent

[11] 3,566,947

| [72] | Inventor | John A. Jukes<br>7174 No. Hidden Place, San Gabriel, Calif. 91775 |
|---|---|---|
| [21] | Appl. No. | 820,147 |
| [22] | Filed | Apr. 29, 1969 |
| [45] | Patented | Mar. 2, 1971 |

[54] SELF-LOCKING THREADED INSERT
7 Claims, 7 Drawing Figs.

[52] U.S. Cl. ............................................. 151/14,
29/523, 85/83, 151/22, 151/41.72
[51] Int. Cl. .................................................. F16b 13/04,
F16b 39/30
[50] Field of Search ........................................ 151/14,
14.5, 22, 21C, 41.72, 41.73; 85/1C, (1 J.P.), 32,
83, 82, 64, 63; 285/355, 332.3; 16/108, 2; 29/523,
522, 507

[56] References Cited
UNITED STATES PATENTS

| 3,163,197 | 12/1964 | Rosan et al. ............... | 151/41.73 |
| 3,220,454 | 11/1965 | Neuschotz.................. | 151/41.72 |
| 1,400,405 | 12/1921 | Ogden....................... | 85/83 |
| 1,447,056 | 2/1923 | Bates......................... | 151/22 |
| 2,407,552 | 9/1946 | Hoesel....................... | 285/355 |
| 2,407,553 | 9/1946 | Hoesel....................... | 285/355 |
| 3,176,746 | 4/1965 | Walton...................... | 151/22 |

FOREIGN PATENTS

| 134,763 | 10/1949 | Australia.................... | 151/14.5 |
| 1,331,527 | 5/1963 | France ...................... | 285/55 |
| 631,969 | 11/1949 | Great Britain............ | 151/14.5 |

*Primary Examiner* — Ramon S. Britts
*Attorney* — Fowler, Knobbe and Martens

ABSTRACT: A thin walled tubular metal insert having a threaded exterior is threaded into a tapped hole in a base member by a tool partially threaded into the interior of the insert. With the insert fully in place, further rotation of the tool completes the threads on a portion of the interior of the insert, thus bulging the insert walls outwardly to lock the insert in the tapped hole.

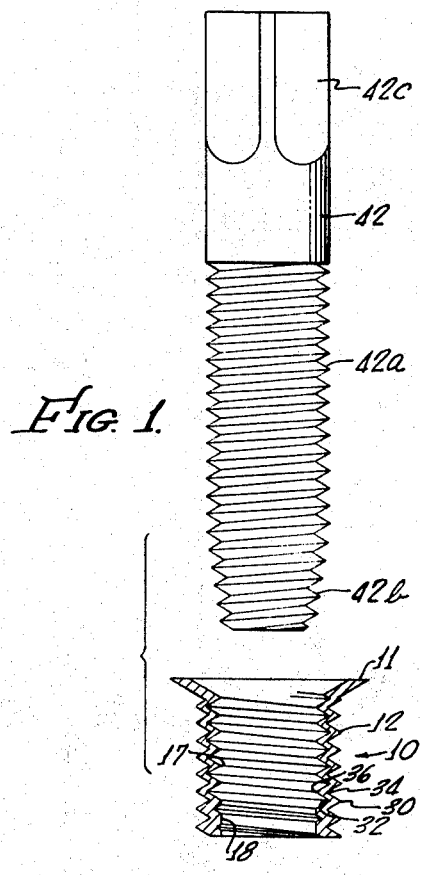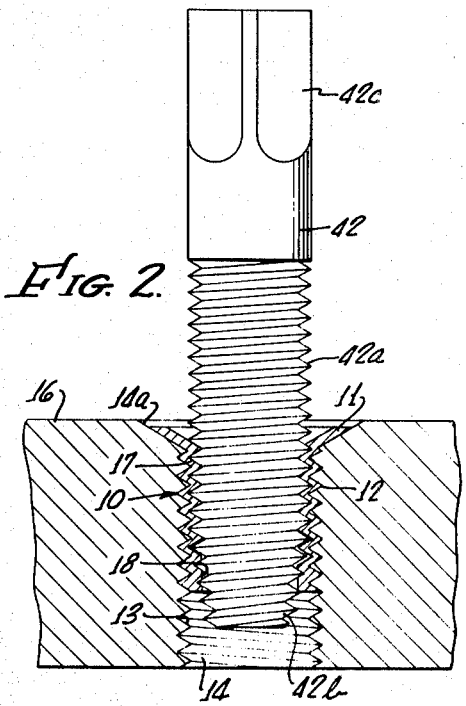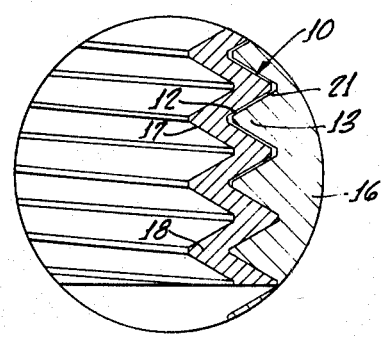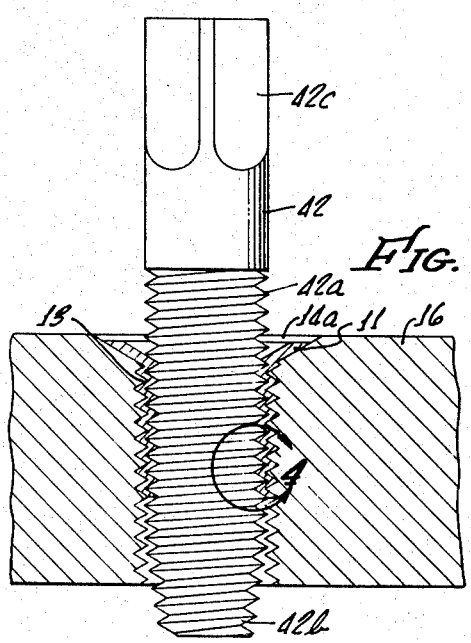

INVENTOR.
JOHN A. JUKES

BY
FOWLER, KNOBBE
& MARTENS
   ATTORNEYS.

SELF-LOCKING THREADED INSERT

BACKGROUND OF THE INVENTION

This invention relates to an improved means for economically increasing the strength of a threaded connection into a base material which is relatively soft. Aluminum and rigid plastic have many desirable structural qualities; however, one drawback to such materials is that threaded connections thereto are relatively weak in that the threads formed may not be able to withstand the forces to which the members may be subjected. This problem arises in connection with a wide variety of end products and particularly with items which must meet high military standards.

Many different approaches have been tried for installing hard inserts to solve the problem of increasing the thread strength in relatively soft materials. Although some of these approaches have had considerable economic success, there is still much room for improvement, particularly when one considers the vast number of threaded connections into relatively soft materials that exist throughout industry. In view of the large numbers of such connections employed, improvements in strength and cost, both in material and in installation, can be highly significant.

One approach which has been attempted is the use of spiral metal coils threaded into the base material. While such coils improve strength, they are somewhat difficult to install and fairly costly to fabricate. Another approach is the use of a threaded insert having axial slots in its exterior and pins initially attached to the insert near its upper end, to be pounded into the base material after the insert has been threaded into the tapped hole in the base material. As can be appreciated, this approach is also expensive from both a fabrication and installation standpoint. In addition, the pins sometimes break off before installation, thus rendering the insert unusable also, the pins deform the thread in the tapped hole.

Inserts having exterior threads which interfere with the threads in the tapped opening of the base material have also been employed, but this solution has been unsatisfactory due to difficulties of installation and removal. Another objection to known inserts is that the wall thicknesses are such that the tapped openings in the base material have to be larger than desirable and some instances, inserts of this type cannot be employed at all in view of the close proximity of a series of tapped openings in a base member.

Accordingly, a need exists for an improved insert which is easy to install, economical to fabricate and highly reliable.

SUMMARY OF THE INVENTION

In accordance with this invention, there is provided a self-locking insert having a generally tubular shape with substantial portions of the exterior and the interior being threaded. The interior includes a portion which does not have complete threads. When installing the insert, a threaded tool is threaded into the interior of the inset until it engages the unthreaded portion of the inner wall. The insert is then threaded into a tapped hole in a base material until a flanged or outwardly flared head on the exterior of the insert engages the base material. The walls of the insert are sufficiently thin, such that the tool can then be forcibly rotated further to complete the threads in the interior of the insert by forcing or bulging the insert walls outwardly to cause the insert to be frictionally locked in the tapped hole.

In a preferred form of the invention, the unthreaded portion on the interior of the insert is located at the lower end, and the inner threads of the insert are radially aligned with the outer threads of the insert. Also, the major diameter of the inner thread is greater than the minor diameter of the exterior thread; thus insuring that the inset insert wall is quite thin so that it can be urged outwardly relatively easily by manually wrenching a tool.

BRIEF DESCRIPTION OF THE DRAWINGS

FIG. 1 shows the insert of the invention is cross section together with a tool about to be placed into the insert;

FIG. 2 shows the insert threaded into a tapped opening in a base material with the tool being threaded into the insert up to the point where its threads interfere with the imperfect threads formed at the lower end of the insert;

FIG. 3 illustrates the arrangement of FIG. 2 after the tool has been threaded further into the insert so as to complete the formerly imperfect threads in the inner wall of the insert;

FIG. 4 is an enlargement of the newly formed threads on the insert together with the surrounding base material and portion of the tool;

DETAILED DESCRIPTION OF PREFERRED EMBODIMENTS OF THE INVENTION

Figure 5:
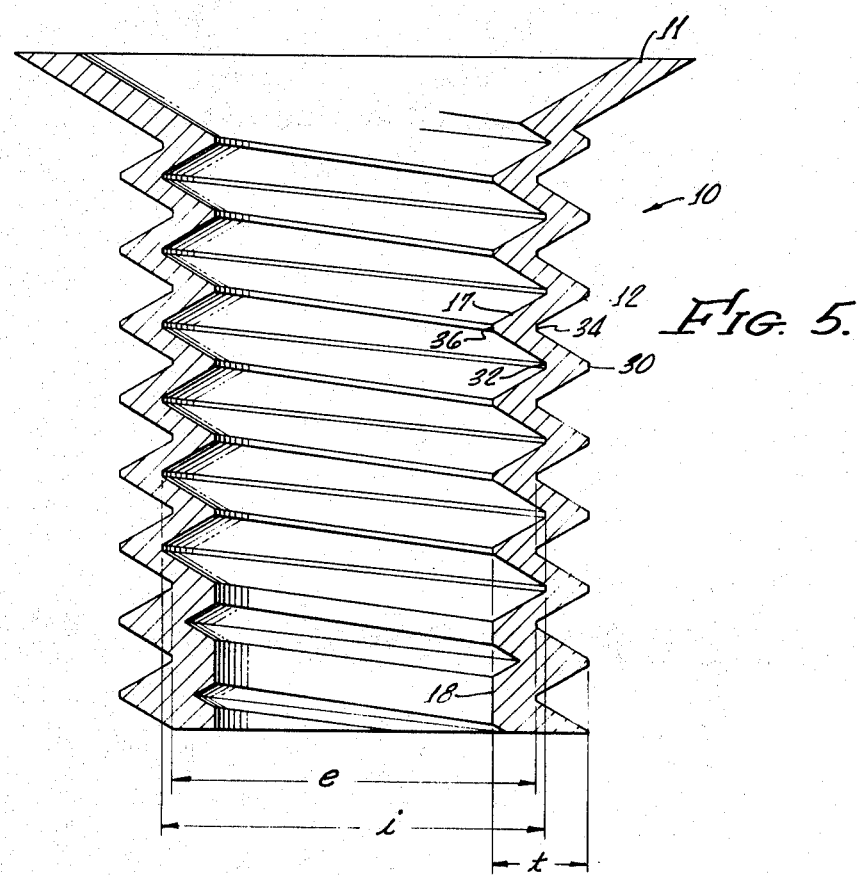
FIG. 5 is an enlarged cross section of the insert of FIG. 2.

Referring first to FIGS. 1 and 5, there is shown a thin walled tubular insert 10 made of a hard metal which will not corrode, such as stainless steel. As can be seen, the upper end of the insert is formed with an outwardly flared head 11 on its exterior. The remainder of the exterior of the insert if formed with a standard machine screw thread 12 which is adapted to threadably mate with a thread 13 formed in a tapped hole 14 in a base or parent member 16. The base member 16 is formed of a material softer than the stainless steel, such as aluminum or a rigid plastic which does not have adequate thread strength to hold reliably a threaded connection to the base member.

The interior of the insert 10 is formed with a thread 17 extending downwardly from the upper end to a lower portion 18, which is formed with an imperfect, or incomplete thread. The portion 18 can be completely unthreaded, but in machining the interior thread 17 it is easier to leave an incomplete thread than no thread at all. The incompletely threaded portion 18 extends for an axial distance of 1 or 2 thread turns, and preferably no more than 3 turns.

As will be noted from FIG. 5, the turns of the interior thread 17 on the threaded portion are radially aligned or timed with the turns of the exterior thread 12. In other words, the outer crest or peak 30 of an exterior thread turn is radially aligned with the root 32 of an interior thread turn, while the root 34 of an exterior thread turn is radially aligned with the inner crest 36 of an interior thread. Such construction enables the insert to have an extremely thin wall. Preferably, the major or root diameter $i$ of the interior thread 17 is larger than the minor or root diameter $e$ of the exterior thread 12. Thus, the maximum wall thickness $t$, that is from the outer crest 30 of the exterior thread 12 to the inner crest 36 of the interior thread 17 is less than the combined depth of the threads 12 and 17. It can be appreciated that if the interior and exterior threads were not substantially radially aligned, such dimensions could not be employed in that the insert walls would be too weak or would be cut through.

The maximum wall thickness of the incompletely threaded portion 18 is equal to or just slightly larger than the maximum thickness $t$ of the complete thread area.

Two advantages of the insert are that it can be fabricated by standard machining operations, and can be easily installed in the base member 16. Shown in FIG. 1 spaced above and aligned with the insert is an installing tool 42 which is a known item having a thread 42a formed on one end with the bottom-most turns 42b of the thread being of decreasing diameter. The basic diameter and pitch of the thread 42a is the same as the interior thread 12 of the insert. The tool is formed of tool steel, and is designed to cold form threads without producing chips, even in such hard materials as stainless steel. The upper end 42c of the tool has wrenching flats to facilitate turning with a wrench.

To install the insert 10 into the base member 16, the tool 42 is first freely threaded into the insert up to the point where the full diameter turns on the tool thread 42a engage the incompletely threaded portion 18 of the insert, as shown in FIG. 2. The insert is then freely threaded into the tapped hole 14 in the parent member 16 up to the point where the outwardly flared head 11 of the insert engages the upper end of the countersink 14a of the tapped hole 14, preventing further inward movement of the insert. The inward movement of the insert could also be limited by engagement of the end of the insert with the bottom of the tapped hole, although this is not the usual arrangement.

By forcibly rotating the tool 42 an additional amount, the tool thread 42a cold forms the unthreaded portion 18 of the insert to complete the thread 17 to the bottom of the insert, as indicated in FIG. 3. Completing the thread of the portion 18 forces or bulges the lower exterior turns of the insert outwardly into frictional engagement with the surrounding turns of the thread 13 of the base member 16.

This arrangement may be more clearly seen from the enlargement of FIG. 4 wherein the upper portion of the insert exterior thread 12 is shown as having a slight standard clearance 21 or fit for machine screws and nuts with the adjacent turns of the threads 13 in the base material. By contrast, the threads 12 and 13 are shown with no clearance at the lower end of the insert but instead in tight frictional engagement with each other. This outward bulging of the lower end of the insert can occur because the insert wall is thin and because the tool 42 is harder than the stainless steel insert, which is harder than the aluminum base member 16. Completing the threads on the insert also threads the insert more tightly into the base member applying axial tension on the insert head 11.

The tool 42 may be easily backed out of the insert by being rotated in the opposite direction, and the insert will remain firmly locked in place in the base member 16. Instead of using a tool 42, a hardened machine screw which might be used as the permanent fastening member, can be used to complete the thread in the insert; and in that case, the screw would not have to be removed, although could of course be removed.

Figure 6:
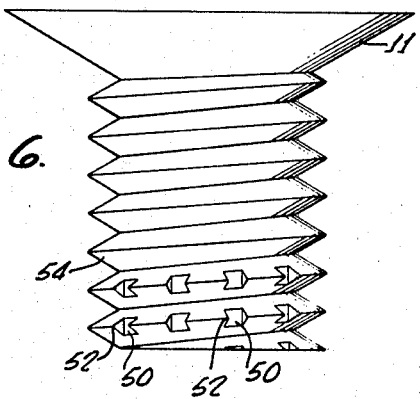
FIG. 6 is an elevational view of a portion of a modified form of an insert having axially notched exterior threads on one end.
Figure 7:
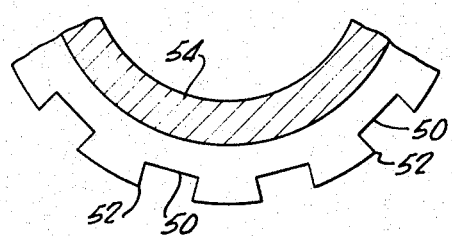
FIG. 7 is an enlarged cross-sectional view of a portion of the notched threads shown in FIG. 6.

Although it has been found that the insert is quite firmly locked in the base members in the manner described, if greater holding power is desired, a series of axial notches 50, as shown in FIGS. 6 and 7, can be formed in the crest of the exterior thread on the lower turns of the insert 54. In other respects, this insert is identical to the insert 10 shown in FIGS. 1-5 and the notches will not deform the exterior thread in a manner to obstruct free installation of the insert as deep as the head will allow. The notches 50 form a series of sharp corners 52 which tend to bite slightly into the surrounding base member as the incomplete thread in the lower end of the insert interior is being completed during installation. Thus, the corners 52 help to maintain the insert locked in the base member.

From the foregoing, it can be appreciated that the insert is relatively inexpensive to manufacture, easy and fast to install, and requires only simple hole preparation in the base member. Also, due to the timed threads of the insert, the insert has a relatively small diameter relative to the tapped hole in the base member. This enables tapped holes in close proximity to be provided with the hardened inserts. Although the insert is securely locked in the base material, it can, nevertheless, be removed relatively simply by employing a known reverse thread tool.

I claim:

1. A self-locking thin walled insert made of a relatively hard material such as stainless steel for installation into a base member made of a material which is somewhat softer than the insert such as aluminum, such insert having a generally tubular shape with an upper portion being outwardly flared on its exterior and having an exterior thread of uniform major and minor diameter throughout extending downwardly from the flared portion, the interior of the insert having a uniform thread substantially timed with said exterior thread except that a small portion of the interior has an incomplete thread defining an internally thickened portion, the wall of the incompletely threaded portion being sufficiently thin such that the incomplete portion can be completed when installed by a threaded tool in a tapped opening and the incomplete portion of the insert will be urged outwardly to secure the insert in the opening.

2. The insert of claim 1 wherein the incompletely threaded portion is located at the end of the insert spaced opposite from said flared portion and the axial length of the incomplete portion is equal to no more than the axial length of two or three turns of the interior thread.

3. The insert of claim 1 wherein the minor diameter of the exterior thread is in a range extending from slightly smaller than the major diameter of the interior thread to slightly larger than the major diameter of the interior thread.

4. The insert of claim 3 wherein the wall of the incompletely threaded portion, extending from its inner minor diameter to the major diameter of the exterior thread is approximately equal to the distance between the minor diameter of the complete and uniform inner thread and the major diameter of the exterior thread.

5. A self-locking thin walled metal insert having a generally tubular shape with an upper portion being outwardly flared on its exterior and having a threaded exterior extending downwardly from the flared portion, the interior of the insert having a thread timed with the exterior thread except that a small portion of the interior has an incomplete thread or is completely unthreaded defining an internally thickened portion, the minor diameter of the external thread being smaller than the major diameter of the complete internal thread, and the internal major diameter of said incomplete portion being about equal to or only slightly larger than the minor diameter of the complete internal threads so that the incomplete portion can be completed when installed by a threaded tool into a tapped opening in a base member made of material softer than the insert causing the incomplete portion of the insert to be urged outwardly to thereby secure the insert in the tapped opening.

6. The insert of claim 5 wherein the crests of the turns of said exterior thread surrounding said interior incomplete portion are formed with a plurality of spaced notches which create a series of sharp corners that bite slightly into the surrounding base material as the thread on said incomplete portion is completed.

7. A method of strengthening the threads of a tapped hole comprising the steps of:

threading a thin walled tubular insert into the exterior of a threaded member which is harder than said tubular insert, the insert having on its interior a completely threaded portion and an incompletely threaded portion defining an internally thickened portion, said insert being initially threaded onto the threaded member no further than where it can be easily turned;

threading the insert into the tapped hole of a base member softer than said tubular insert to a point where it can be threaded no further because of interference between the insert and the base member; and forcibly turning said threaded member further into the insert so as to complete the thread on said incompletely threaded portion of the insert and also to cause the exterior of the thin walled insert surrounding the interior newly threaded portion to be urged outwardly so as to lock frictionally the insert in the base member, thus enabling the threaded member to be easily withdrawn.